US00RE42022E

(19) United States
(12) Reissued Patent
Pizzi

(10) Patent Number: US RE42,022 E
(45) Date of Reissued Patent: Jan. 4, 2011

(54) INSULATED JUMPER IN PARTICULAR FOR TERMINAL BLOCKS OF SWITCHBOARDS

(75) Inventor: Giordano Pizzi, Milan (IT)

(73) Assignee: Morsettitalia S.p.A., Milan (IT)

(21) Appl. No.: 12/370,105

(22) Filed: Feb. 12, 2009

Related U.S. Patent Documents

Reissue of:
(64) Patent No.: 7,413,486
Issued: Aug. 19, 2008
Appl. No.: 11/774,220
Filed: Jul. 6, 2007

(30) Foreign Application Priority Data

Jul. 7, 2006 (IT) ..... MI2006A1322

(51) Int. Cl.
*H01R 11/09* (2006.01)

(52) U.S. Cl. ..... 439/787; 439/796
(58) Field of Classification Search ..... 439/787, 439/796, 797, 798, 716, 723, 439, 521, 714, 439/710
See application file for complete search history.

(56) References Cited

U.S. PATENT DOCUMENTS

| | | | |
|---|---|---|---|
| 945,017 | A | 1/1910 | Cole |
| 2,045,847 | A | 6/1936 | Fotsch |
| 2,082,947 | A | 6/1937 | Fotsch |
| 2,900,618 | A | 8/1959 | Geier |
| 3,159,730 | A | 12/1964 | Staffel |
| 3,609,642 | A | 9/1971 | Norden |
| 3,665,376 | A | 5/1972 | Paris et al. |
| 3,751,579 | A | 8/1973 | Nojiri |
| 3,775,733 | A | 11/1973 | Ege |
| 3,840,781 | A | 10/1974 | Brown |
| 4,070,086 | A | 1/1978 | Trafford |
| 4,130,331 | A | 12/1978 | Neff et al. |
| 4,171,861 | A | 10/1979 | Hohorst |
| 4,203,200 | A | 5/1980 | Wiebe |
| 4,224,592 | A | 9/1980 | Urani et al. |
| 4,241,975 | A | 12/1980 | Cooper, Jr. |
| 4,330,164 | A | 5/1982 | Pittman et al. |
| 4,340,270 | A | 7/1982 | Wilmes et al. |
| 4,350,407 | A | 9/1982 | Tong |
| 4,365,396 | A | 12/1982 | Baba et al. |
| 4,391,485 | A | 7/1983 | Urani |
| 4,444,455 | A | 4/1984 | Wiancko et al. |
| 4,559,504 | A | 12/1985 | Krec |
| 4,693,533 | A | 9/1987 | Szczesny et al. |
| 4,795,997 | A | 1/1989 | Fisher et al. |

(Continued)

FOREIGN PATENT DOCUMENTS

| | | | |
|---|---|---|---|
| DE | 1842868 | U | 12/1961 |
| DE | 3339365 | A1 | 5/1985 |
| DE | 3621071 | A1 | 1/1987 |
| DE | 3629796 | C1 | 12/1987 |
| DE | 3805158 | A1 | 8/1989 |

(Continued)

OTHER PUBLICATIONS

European Search Report from EP08075059, dated, Aug. 24, 2009.

*Primary Examiner*—Hae Moon Hyeon
(74) *Attorney, Agent, or Firm*—Mintz Levin Cohn Ferris Glovsky and Popeo, P.C.; A. Jason Mirabito, Esq.

(57) ABSTRACT

Electrical connection jumper, in particular for terminal blocks of switchboards, comprising a conducting body extending in the longitudinal direction and a plurality of connector elements for electrical connection, which extend in the transverse direction from said conducting body, and an insulating body, integral with said conducting body, said insulating body comprising a longitudinally extending gripping part and pairs of lugs which extend therefrom in a substantially transverse direction and are able to contain partially said conducting body.

16 Claims, 1 Drawing Sheet

U.S. PATENT DOCUMENTS

| | | | |
|---|---|---|---|
| 4,889,504 | A | 12/1989 | Barbier et al. |
| 4,921,450 | A | 5/1990 | Herbert |
| 4,940,431 | A | 7/1990 | Hennemann |
| 5,002,505 | A | 3/1991 | Jones et al. |
| 5,030,131 | A | 7/1991 | Boehm |
| 5,243,139 | A | 9/1993 | Law |
| 5,276,280 | A | 1/1994 | Ball |
| 5,328,392 | A | 7/1994 | Lin et al. |
| 5,454,730 | A | 10/1995 | Tozuka |
| 5,553,787 | A | 9/1996 | Guginsky |
| 5,564,941 | A | 10/1996 | Norden |
| 5,766,044 | A | 6/1998 | Norden |
| 5,853,304 | A | 12/1998 | Landreau et al. |
| 5,860,837 | A | 1/1999 | Bock et al. |
| 5,905,230 | A | 5/1999 | Marik |
| 5,915,998 | A | 6/1999 | Stidham et al. |
| 6,004,167 | A | 12/1999 | Hirakawa |
| 6,157,287 | A | 12/2000 | Douglass et al. |
| 6,475,038 | B1 | 11/2002 | Franck |
| 6,786,779 | B2 | 9/2004 | Feldmeier et al. |
| 7,101,231 | B2 | 9/2006 | Prokup et al. |
| 7,385,518 | B2 | 6/2008 | Torrez et al. |
| 7,413,486 | B2 | 8/2008 | Pizzi |
| 7,438,606 | B2 | 10/2008 | Pizzi |
| 7,500,889 | B2 | 3/2009 | Pizzi |
| 2002/0067279 | A1 | 6/2002 | Torrez et al. |
| 2005/0042912 | A1 | 2/2005 | Drewes et al. |
| 2005/0221665 | A1 | 10/2005 | Otto et al. |
| 2006/0128232 | A1 | 6/2006 | Kim |
| 2006/0148302 | A1 | 7/2006 | Patel et al. |
| 2006/0189222 | A1 | 8/2006 | Bogiel et al. |
| 2006/0228950 | A1 | 10/2006 | Jamaleddin et al. |
| 2007/0159292 | A1 | 7/2007 | Chang et al. |
| 2008/0242150 | A1 | 10/2008 | Chikamatsu et al. |

FOREIGN PATENT DOCUMENTS

| | | | |
|---|---|---|---|
| DE | 4223540 | A1 | 1/1994 |
| DE | 4231244 | A1 | 3/1994 |
| DE | 4409612 | A1 | 9/1994 |
| DE | 19530947 | A1 | 1/1997 |
| DE | 19542628 | C1 | 2/1997 |
| DE | 19729327 | C1 | 10/1998 |
| DE | 29821558 | U1 | 3/1999 |
| DE | 29921080 | | 4/2001 |
| DE | 10010719 | C1 | 8/2001 |
| DE | 10324144 | A1 | 2/2005 |
| DE | 102004018553 | A1 | 11/2005 |
| DE | 202005005369 | U1 | 3/2006 |
| EP | 0382999 | | 8/1990 |
| EP | 0678934 | A1 | 10/1995 |
| EP | 0893859 | A2 | 1/1999 |
| EP | 1137034 | A1 | 9/2001 |
| EP | 1137035 | A1 | 9/2001 |
| EP | 1381068 | A1 | 1/2004 |
| EP | 1531522 | A1 | 5/2005 |
| EP | 1536519 | A1 | 6/2005 |
| EP | 1630903 | A1 | 3/2006 |
| EP | 1798821 | A2 | 6/2007 |
| EP | 1860738 | A1 | 11/2007 |
| EP | 1887658 | A2 | 2/2008 |
| FR | 2259462 | A1 | 8/1975 |
| FR | 2529024 | A1 | 12/1983 |
| FR | 2637740 | A1 | 4/1990 |
| FR | 2766628 | A1 | 1/1999 |
| GB | 2342508 | A | 4/2000 |

INSULATED JUMPER IN PARTICULAR FOR TERMINAL BLOCKS OF SWITCHBOARDS

Matter enclosed in heavy brackets [ ] appears in the original patent but forms no part of this reissue specification; matter printed in italics indicates the additions made by reissue.

BACKGROUND

1. Technical Field of the Invention

The present invention relates to an insulated jumper in particular for terminal blocks of switchboards and the like.

2. Description of the Prior Art

It is known in the technical sector relating to terminal blocks for switchboards that there exists the need to connect together two terminals arranged alongside each other on the board in order to form the required electric circuit.

Jumpers made of conductive material and designed for this purpose are also known; said jumpers are formed by a conductive metal strip extending in a substantially longitudinal direction having, extending from it in a direction perpendicular to the above direction, flat pins formed in the manner of two resilient jaws able to form the part for engagement in the seat of the terminal block.

These known jumpers, although fulfilling their purpose, since they can be easily cut in the transverse direction in order to determine correct measurement in the longitudinal direction, have the drawback, however, that they cannot be electrically insulated with respect to the exterior, in particular at the time of use by a user; this results in a high risk of contact with the user him/herself and/or with foreign bodies and therefore injury both for the former, who may suffer an electric shock, and damage for the system which is short-circuited.

In order to solve the problem of insulation, jumpers are also known where the conductive strip is embedded in an insulating body; in this case also, however, there is the risk of drawbacks arising from the fact that cutting to size of the jumper is difficult owing to the double and different superimposed material, which requires complicated cutting operations using different tools respectively adapted to the type and thickness of material to be cut, making cutting practically impossible.

SUMMARY

The technical problem which is posed, therefore, is to provide electrical connection jumpers, in particular for terminals of switchboards, which are able to be cut to size and ensure perfect insulation of the visible conducting parts so as to prevent them from coming into contact with the user and/or with foreign bodies, causing short-circuits of the system.

In connection with this problem it is also required that this jumper should have small dimensions, be easy and inexpensive to produce and assemble and be able to be adapted easily at any user location using cutting means which are easy and inexpensive to provide.

These results are obtained according to the present invention by an electrical connection jumper, in particular for terminal blocks of switchboards and the like, comprising a conducting body extending in the longitudinal direction, a plurality of connector elements extending in the transverse direction from said conducting body, and an insulating body, integral with said conducting body, said insulating body comprising a longitudinally extending gripping part and pairs of oppositely arranged lugs which extend therefrom and are able to contain partially said connector elements.

BRIEF DESCRIPTION OF THE FIGURES

Further details may be obtained from the following description of a non-limiting example of embodiment of the subject of the present invention provided with reference to the accompanying drawings in which.

DETAILED DESCRIPTION OF PREFERRED EMBODIMENTS

Figure 1:
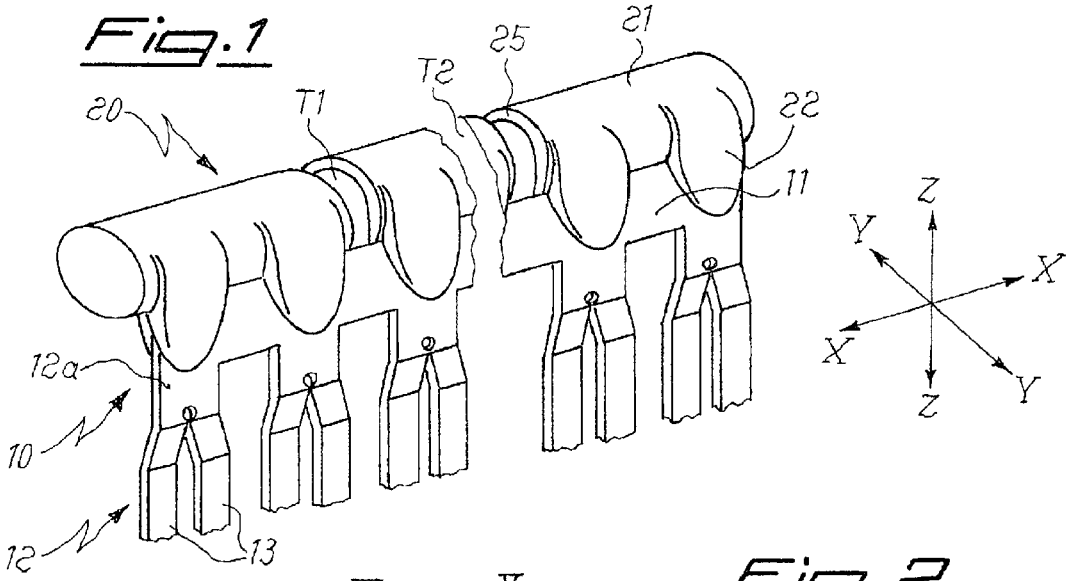
FIG. 1 shows a perspective view of a jumper according to the present invention, in its entirety.
Figure 2:
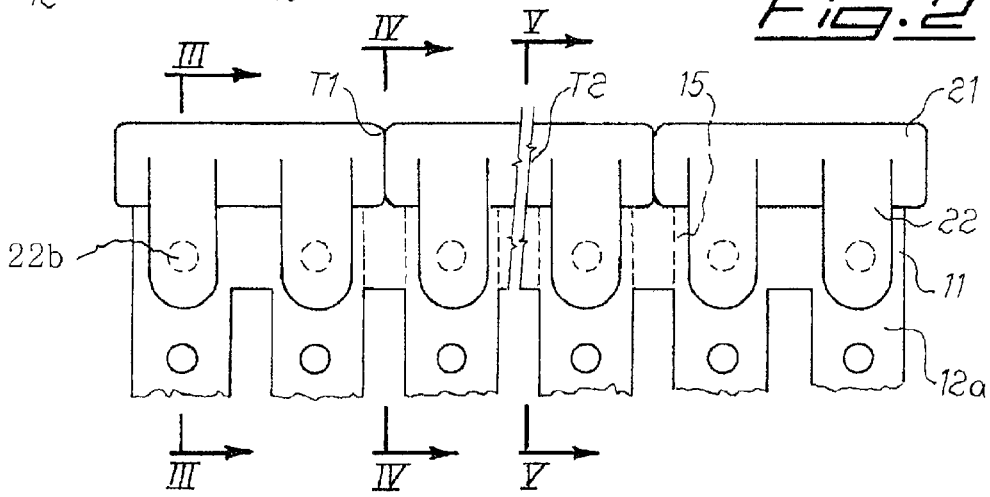
FIG. 2 shows a side view of the jumper according to FIG. 1.

As shown in FIGS. 1 and 2 and assuming solely for the sake of convenience of the description and without a restrictive meaning, a set of three reference axes with a longitudinal direction X-X, transverse direction Y-Y and vertical direction Z-Z, respectively, the jumper for terminal blocks of switchboards according to the present invention comprises essentially: a conducting body 10 extending in the longitudinal direction X-X in the form of a thin strip 11 which has suitable dimensions for the electric load envisaged, and a plurality of connector elements 12 which extend in the transverse direction Y-Y from said strip 11 and are formed by a neck 12a which is extended by one or more (two in the example of the figure) flat pins 13 for connection to the terminal (not shown).

The conducting body 10 is integrally joined to an insulating body 20 comprising a substantially continuous, longitudinally extending gripping part 21 which, in the example shown in the figure, has a circular cross-section with, extending from it, pairs of lugs 22 symmetrically arranged opposite each in the transverse direction Y-Y and aligned with each other in the longitudinal direction at a constant interval.

The lugs 22 of each pair are suitably spaced from each other in the transverse direction Y-Y so as to form a respective seat 22a in the vertical direction, such as not to penetrate into the gripping part 21 of the longitudinally extending insulating body 20.

Figure 3:
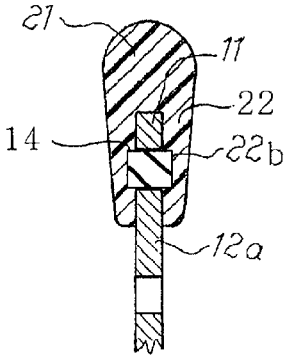
FIG. 3 shows a schematic cross-section along the plane indicated by III-III in FIG. 2.

As shown in FIG. 3, said lugs 22 have pins 22b extending in the transverse direction Y-Y and suitable for engagement with a corresponding seat 14 open in the transverse direction in the neck 12a of the conducting part 10.

In this way the connection between conducting body 10 and insulating body 20 ensures that the gripping part 21 of the said insulating body is free of electrical conduction.

Advantageously this connection is obtained by overmoulding the insulator onto the conducting body.

It can also be seen how, at the opposite ends, the insulating body always projects in the longitudinal direction X-X beyond the conducting body, thus ensuring insulation of the jumper with respect to the user.

This configuration provides numerous advantages compared to the prior art since, when the jumper is cut to size, it will be possible to cut separately the insulating material and the conducting strip, thus ensuring the ease of cutting using conventional tools.

Figure 4:
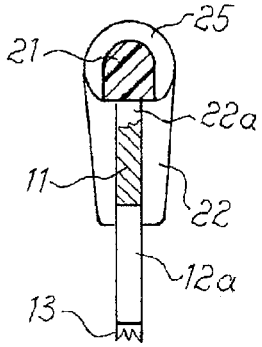
FIG. 4 shows a schematic cross-section along the plane indicated by IV-IV in FIG. 2.
Figure 5:
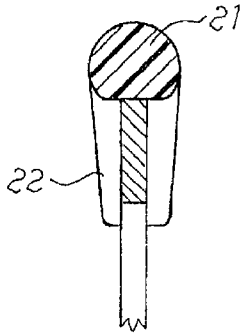
FIG. 5 shows a schematic cross-section along the plane indicated by V-V in FIG. 2.

In addition to this, cutting may be performed both in a position T1 predisposed for cutting (FIG. 4) by means of an annular undercut 25 of the gripping part and in a position T2 which is not predisposed for cutting (FIG. 5), while keeping, however, the gripping part totally insulated.

Said predisposed cutting zone T1 or non-predisposed cutting zone T2 is situated between two pairs of lugs 22 which are adjacent in the longitudinal direction, and the vertical cutting plane of the conducting part is inset in the longitudinal direction with respect to the cutting plane of the insulating body; correspondingly cutting of the conducting body 10 produces zones 15 where the conductor is inset in the longitudinal direction with respect to the cutting zone T1/T2 of the gripping part 21; in this way, since it is possible to obtain a free conducting edge which is set back from the insulating body, the risks of contact with the conducting part are reduced considerably.

Although illustrated and described in relation to a strip extending longitudinally as appropriate and to be cut, subsequently, to size, it is envisaged also that the jumper may be designed in modular form with a single connection body, with two or more bodies, or with a non-uniform succession of cutting zones determined by the alternating arrangement of jumpers with one, two or three, etc. connections.

Although not shown, it is envisaged moreover that the electrical connection part 13 may be formed with a screw element and/or clamp element as required and/or appropriate.

It can therefore be seen how with the electrical connection jumper for switchboard terminal blocks according to the present invention it is possible to achieve easily the production and/or cutting to size of the jumper and at the same time insulation of the gripping part which no longer contains the conducting part.

The invention claimed is:

1. An electrical connection jumper for terminal blocks of switchboards, comprising a conducting body extending in a longitudinal direction and a plurality of connector elements for electrical connection, which extend in a transverse direction from said conducting body, and an insulating body, integral with said conducting body, wherein said insulating body comprises a longitudinally extending gripping part and pairs of lugs which extend there from in a substantially transverse direction and partially contain said conducting body, wherein the pairs of lugs are spaced from each other in the transverse direction so as to form a respective seat for the conducting body.

2. The jumper according to claim 1, wherein said gripping part of the insulating body is continuous.

3. The jumper according to claim 1, wherein said lugs are arranged symmetrically opposite each other in the transverse direction.

4. The jumper according to claim 1, wherein a depth in the vertical direction of said seat formed by the lugs is such as not to penetrate into the gripping part of the insulating body extending longitudinally.

5. The jumper according to claim 1, wherein the conducting body includes at least one neck and at least one connection element extending from each neck.

6. The jumper according to claim 5, wherein said lugs have at least one pin extending in a transverse direction and engaging a seat which is open in the transverse direction in the neck of the conducting body.

7. The jumper according to claim 6, wherein said connection element comprises one or more flat pins which extend in the transverse direction from said neck for connection to a switchboard terminal.

8. The jumper according to claim 6, wherein said connection element comprises screw means which extend in the transverse direction from said neck for connection to a switchboard terminal.

9. The jumper according to claim 6, wherein the lugs are partially overmoulded onto the neck of the conducting body.

10. The jumper according to claim 6, wherein the neck is formed as a strip of suitable length in the longitudinal direction.

11. The jumper according to claim 1, wherein the insulating body is overmoulded onto the conducting body.

12. The jumper according to claim 1, wherein said gripping part of the insulating body has at least one annular undercut that defines a cutting zone of the gripping part that is predisposed for transverse cutting.

13. The jumper according to claim 12, wherein said cutting zone is situated between two pairs of lugs adjacent in the longitudinal direction.

14. The jumper according to claim 12, wherein a vertical cutting plane of the conducting body is aligned in the longitudinal direction with respect to the cutting zone of the gripping part.

15. The jumper according to claim 1, wherein said pairs of lugs symmetrically arranged opposite each other in the transverse direction are spaced from each other in the longitudinal direction at a constant interval.

16. The jumper according to claim 1, wherein the opposite ends of the insulating body project in the longitudinal direction with respect to the conducting body.

* * * * *